United States Patent [19]

Rossmy

[11] 3,872,146

[45] Mar. 18, 1975

[54] PROCESS OF REMOVING SULFATE GROUPS FROM ORGANOPOLYSILOXANES

[75] Inventor: Gerd Rossmy, Essen-Werden, Germany

[73] Assignee: Th. Goldschmidt AG, Essen, Germany

[22] Filed: May 22, 1974

[21] Appl. No.: 472,359

[30] Foreign Application Priority Data

June 16, 1973 Germany.............................. 2330717

[52] U.S. Cl.. 260/448.2 E, 260/46.5 E, 260/46.5 R, 260/448.2 N, 260/448.8 R
[51] Int. Cl. .............................................. C07f 7/08
[58] Field of Search . 260/448.2 E, 448.8 R, 46.5 R, 260/46.5 E

[56] References Cited
UNITED STATES PATENTS 2,968,643  1/1961  Bailey ............................ 260/46.5 R
3,161,611  12/1964  Rossmy .................... 260/448.8 R X
3,187,033  6/1965  Nitzsche et al............... 260/448.2 E
3,595,885  7/1971  Rossmy et al............ 260/448.2 E X Primary Examiner—Paul F. Shaver
Attorney, Agent, or Firm—Toren, McGeady and Stanger

[57] ABSTRACT

In the disclosed process, sulfate groups are removed from organopolysiloxanes which contain groups in which the sulfate groups to be removed are intramolecularly and/or terminally linked to silicon atoms. According to the inventive process, the organopolysiloxanes are reacted with peralkylated amides of carboxylic acids, phosphonic acids and/or phosphoric acids, whereby a $SO_3$-containing peralkylated acid amide phase is obtained. This phase is then separated from the system.

According to a preferred embodiment of the invention, the reaction with the peralkylated amide of the indicated acids is repeated one or several times.

8 Claims, No Drawings

PROCESS OF REMOVING SULFATE GROUPS FROM ORGANOPOLYSILOXANES

FIELD OF INVENTION

The invention is directed to organopolysiloxanes which contain groups in which sulfate groups are intramolecularly and/or terminally linked to silicon atoms.

The invention is particularly directed to a process of removing such sulfate groups from the organopolysiloxanes.

BACKGROUND INFORMATION AND PRIOR ART

Organopolysiloxanes which contain the groupings ≡SiOSO$_3$Si≡ and/or ≡SiOSO$_3$H, have a significant technological and industrial importance. This is so because such organopolysiloxanes distinguish themselves by their equilibration condition. The term "equilibration" in this context is deemed to refer to the obtainment of an equilibrium condition in relation to the molecular weight distribution and the distribution of the individual organosiloxane units. Numerous processes for the production of such organopolysiloxanes have previously been suggested. Reference in thus had to German Offenlegungsschrifts 2 059 546 and 2 059 554. The first mentioned Offenlegungsschrift is directed to a procedure for the preparation of equilibrated organopolysiloxane mixtures which are predominantly linear and contain terminal sulfuric acid groups. The equilibrated organopolysiloxane mixtures of the German Offenlegungsschrift can be represented by the general formula

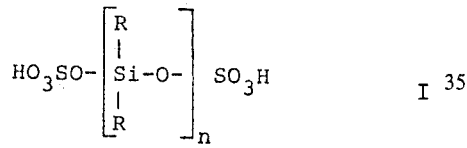  I

In this formula, the letter $n$ stands for a value of 2 to 20 while R is a hydrocarbon group which in some cases may be substituted by a group which is inert to sulfuric acid. A portion of the hydrocarbon groups R may be replaced by the group

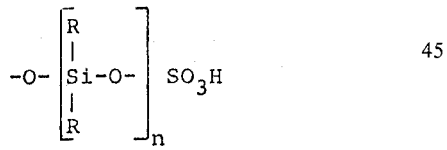

The substances of formula I above are in equilibrium with cyclic compounds of the general formula

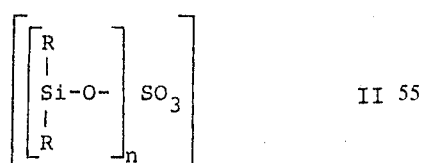  II and sulfuric acid.

In formula II above, R has the above indicated meaning while two of the groups

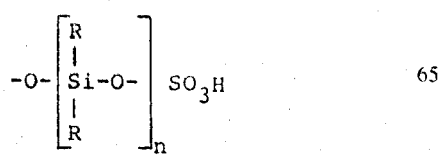

may be replaced by one group

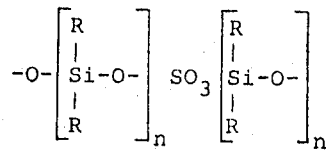

In formula II, $m$ has a value of from 1 to 10, preferably 1 or 2.

The subject matter of Offenlegungsschrift 2 059 554, as mentioned above, is a process for the preparation of equilibrated mixtures of polydiorganosiloxanylsulfates of the general formula

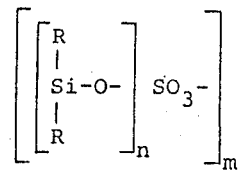

In this formula, $n$ has a value of 2 to 20, preferably 2 to 10, while $m$ has a value of 1 to 10, preferably 1 to 2; the R groups may be the same or different and indicate lower alkyl of preferably 1 or 2 carbon atoms which, if desired, may be substituted. A portion of the R groups may be replaced by aromatic groups, preferably by phenyl, or by the group

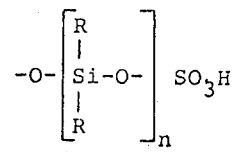

According to the Offenlegungsschrift, two of the R groups may be replaced inter- or intramolecularly by one group

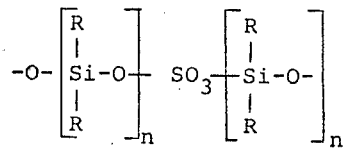

Of particular importance are those sulfate groupcontaining organopolysiloxanes which additionally comprise terminal silylhalides, particularly silylchloride groups. In this system, the organopolysiloxanes are again in equilibrated form or condition due to the presence of SO$_3$ groups which are intramolecularly linked to silicon atoms. Procedures for the preparation of such products are disclosed in German Patent 1 174 509 and in German Offenlegungsschrift 1 420 493.

Polysiloxanes containing silylhalide and silylsulfate groups are important starting materials for processes for the production of derivative compounds of such polysiloxanes, such as, for example, for the production of hydroxyl groups-containing polysiloxanes, wherein the polysiloxanes are approximately or almost in statistical equilibrium. Such processes are disclosed, for example, in German Patent 1 495 926 and in German Offenlegungsschrift 1 720 855. Further, as taught in German Patent 1 495 961, equilibrated organopolysiloxanes with terminal acyloxy groups can be prepared while, pursuant to the teaching of German Offenlegungsschrift 1 795 557, equilibrated polyalkyl silicic acid esters can be produced.

The products are moreover suitable for the modification of epoxy resins as disclosed in German Offenlegungsschrift 1 520 015.

Although it is a fact that the presence of the sulfate groups which are intramolecularly or terminally linked to silicon atoms, is the precondition for causing an optimum equilibration condition, it is also a fact that the presence of these sulfate groups has an undesired influence in some applications of these substances. Thus, for example, the presence of sulfate groups is highly disturbing in the reaction of the substances with water or organic hydroxyl compounds. This is so because in the reaction the strong and corrosive sulfuric acid is liberated. Further, when organopolysiloxanes which contain sulfate groups as well as silylhalide groups are reacted with organic hydroxyl compounds — as, for example, alcohols or polyalkyleneglycolmonoalkylethers — the presence of the sulfate groups requires the use of acid acceptors, such as, for example, amines or ammonia. In such systems voluminous salts precipitate which oftentimes can be filtered off with great difficulty. Moreover, the sulfuric acid which initially is liberated has the tendency to react with the hydroxyl compounds to form their sulfuric acid esters. For all these reasons, the presence of the sulfate groups in polysiloxane systems of the indicated kind is oftentimes undesired.

SUMMARY OF THE INVENTION

It is a primary object of the invention to overcome the disadvantages and drawbacks referred to and to propose a procedure for removing sulfate groups from polysiloxanes which contain groups wherein sulfate groups are intramolecularly and/or terminally linked to silicon atoms.

Thus, although the present invention initially makes use of the equilibrating properties of siloxanylsulfate groups, the invention also provides to remove these groups thereafter from the organopolysiloxanes and to replace them by siloxane linkages. Terminal silylhalide groups are maintained in the inventive procedure and may then be utilized for the preparation of the most different modified organopolysiloxanes. By proceeding in accordance with the inventive process, the equilibration condition of the organopolysiloxanes which have been freed from siloxanylsulfate groups, is obtained to a far reaching extent.

Briefly, and in accordance with the invention, the sulfate is removed by reacting the sulfate groups containing organopolysiloxanes with peralkylated amides of carboxylic acids, phosphonic acids and/or phosphoric acids, whereby a —$SO_3$— containing peralkylated acid amide phase is obtained which is thereafter separated from the system. In many instances it may be suitable to repeat the procedure one or several times.

For the purposes of this invention, peralkylated amides are particularly suitable whose alkyl groups contain not more than 4 carbon atoms.

Particularly preferred peralkylated amides are the permethylated acid amides. Experiments have indicated that especially suitable for the inventive purpose are dimethylformamide, dimethylacetamide and hexamethylphosphoricacidtriamide. Other amides, such as, for example, N-N'-tetramethylurea, diethylformamide, N-tetramethyl-ethylphosphonicaciddiamide, N-N'-tetraethylurea, and diethylacetamide, are also suitable within the scope of this invention.

The quantity of peralkylated amides to be used should at least be equivalent to the amount of sulfate groups. However, it is preferred to use an excess of peralkylated amides.

As stated above, it is oftentimes of advantage to repeat the procedure one or several times. The reaction temperature is not critical for the inventive purposes. The upper temperature to be used is merely limited by the decomposition point of the complexes which are formed from peralkylated acid amides and $SO_3$. Of course, a lower temperature than that of the decomposition point has to be chosen. Preferably, the reaction is carried out within a range of about 10° to 80°C.

The reaction proceeds smoothly and without any difficulty. In this context it should be noted that it is surprising that the SiOS linkages are very easily split by the peralkylated acid amides.

The inventive procedure is beneficially influenced by the fact that the complexes of peralkylated acid amides and $SO_3$ are insoluble in the organopolysiloxane.

In carrying out the inventive procedure, the polysiloxanes which contain the siloxanylsulfate groups, are agitated or shaken with the peralkylated acid amides, whereupon the splitting of the molecules and the elimination of the sulfate groups from the polysiloxane molecule takes place. Upon termination of the agitation or shaking, a separate phase can be observed which consists of the formed peralkylacidamide/$SO_3$ complexes which may be dissolved in the excess of peralkylated acid amides. The procedure can now be repeated one or several times until no siloxanylsulfate groups can be detected in the system. The silylhalide groups which are contained in the molecule are unaffected and remain quantitatively, unless still amounts of siloxanol groups are additionally contained in the siloxanes, as this is customary in this equilibrium condition. In such case, small amounts of complexes of peralkylated acid amides and hydrogen halide are also separated. The inventive procedure thus offers the additional advantage to supply organopolysiloxanes with terminal silylhalide groups which are devoid of siloxanol groups.

The organopolysiloxanes which are obtained after the removal of the siloxanylsulfate groups contain usually small amounts of peralkylated acid amide. For most applications the presence of such small amounts of acid amide is of no consequence. However, if desired, the residual acid amides can be readily removed from the polysiloxanes, for example, by distillation.

The starting compounds for carrying out the inventive procedure, to wit, the sulfate group containing polysiloxane may be represented, for example, by the following formula:

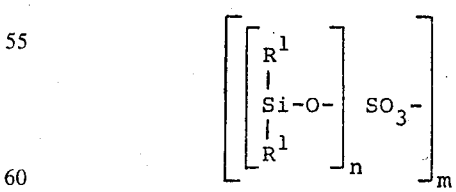

In this formula, the various symbols have the following meanings:
$n = 2$ to 20, preferably 2 to 10;
$m = 1$ to 10, preferably 1 to 2;
$R^1$ may be the same or different and indicates lower alkyl of preferably 1 or 2 carbon atoms. The alkyl groups may be substituted.

The R groups may partially be replaced by aromatic groups, preferably phenyl, or by the group

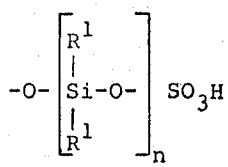

However, it is also feasible to replace two groups $R^1$ inter- or intramolecularly by one group

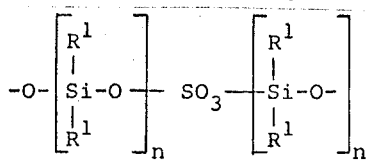

Other starting materials which can successfully be processed in accordance with the inventive procedure, correspond to the formula

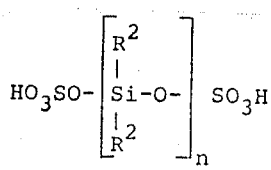

In this formula, the various symbols have the following meanings:

$n = 2$ to $20$;

$R^2$ stands for hydrocarbon which may be substituted by a group which is inert in relation to sulfuric acid. A portion of the $R^2$ groups may be replaced by the group

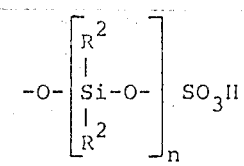

Finally, as a further example of suitable starting materials for the inventive purposes, compounds of the following formula may be mentioned:

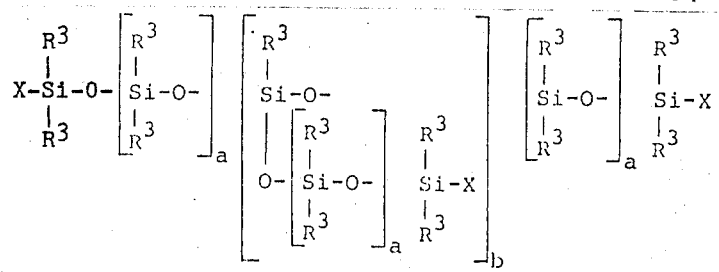

wherein X stands for halogen, preferably Cl or Br. A portion of the X groups, however, can be replaced by bridging

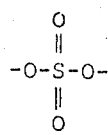

groups. If such replacement is effected, then instead of two SiX groupings, one $\equiv$SiOSO$_3$Si$\equiv$ grouping is then obtained by intramolecular or intermolecular linking.

The symbols $a$ and $b$ are suitable number $\geq 0$. It is preferred if $b = 0 - 50$, particularly $0 - 10$. The value for $a$ is so selected that the average molecule contains $2 - 100$, preferably $4 - 50$ silicon atoms.

The R groups ($R^1$, $R^2$ and $R^3$) which are linked to the silicon of the polysiloxane starting compounds should at least dominantly be methyl groups. However, other alkyl, aryl and/or substituted hydrocarbons may also be present, as, for example, the following groups:

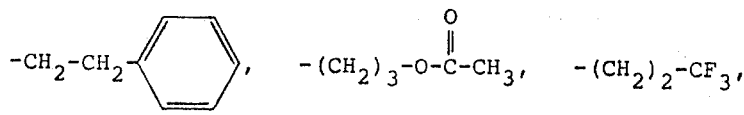

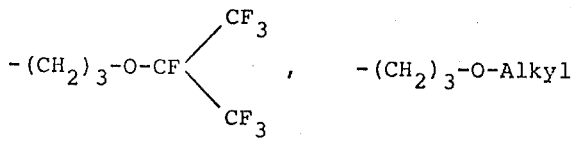

What is essential is that these R groups are inert in respect of acidic catalysts and thus can be equilibrated therewith. The nature of such catalysts is well known in the art and attention is thus directed to "Chemie and Technologie der Silicone" by W. Noll, Verlag Chemie, 1968, which contains detailed information in respect of such groups which are not affected by acidic catalysts.

The invention will now be described by several Examples, it being understood, however, that these Examples are given by way of explanation and not by way of limitation and that many changes may be effected without affecting in any way the scope and spirit of the invention as recited in the appended claims.

EXAMPLE 1

120 g of a siloxanyl sulfate of the average formula
[(CH$_3$)$_2$SiO—]$_{1.973}$SO$_3$
were admixed with 77.4 g of dimethylformamide (2 mole of dimethylformamide per mole of SO$_3$). The mixture was maintained at room temperature by cooling. After about 40 minutes, the originally clear solution turned opaque and crystalline dimethylformamide · SO$_3$ precipitated. In addition, a second liquid phase separated. The upper, siloxane-rich phase (52.5 g) was analyzed and an SO$_3$-content of only 3.3 percent by weight was established. By again shaking with 2 mole of dimethylformamide per mole of SO$_3$, a further amount of SO$_3$, was removed and analysis indicated an SO$_3$ content of 1.25 percent by weight. By continuing shaking with fresh amounts of dimethylformamide, an SO$_3$-free highly viscous dimethylsiloxane was obtained.

EXAMPLE 2

A methylpolysiloxane with terminal ≡Si-Cl groups was prepared by hydrolysis of 299 g of methyltrichlorosilane and 3,302 g of dimethyldichlorosilane with 463.9 g of water. The water was added in dropwise manner into the cooled silane mixture. The methylpolysiloxane was subsequently equilibrated by the addition of 46.9 g of H$_2$SO$_4$ at 50°C. Upon heating to 100°C, a methylpolysiloxane was obtained which contained 2.004 · 10$^{-3}$ val of Cl/g and 0.217 · 10$^{-3}$ mole of SO$_3$/g. This siloxane was shaken with 10 percent by weight of dimethylformamide at 50°C for 1 hour and the SO$_3$-containing dimethylformamide phase thus obtained was separated. The shaking procedure was twice repeated under identical conditions and the SO$_3$-containing dimethylformamide phase was separated in each case. SO$_3$-free methylpolysiloxane with 1.703 · 10$^{-3}$ val of Cl/g was obtained. 50 g of this siloxane were reacted in 920 ml of toluene with a polyether mixture of the average molecular weight of 1,980 and i-propanol. The components of the polyether mixture were obtained by addition of propyleneoxide and ethyleneoxide (weight ratio 51 : 49) in statistical sequence to butanol. The addition reaction was terminated in each case with 2 mole of propyleneoxide per mole of butanol-starter. 1.2 mole of polyethermonool and 0.2 mole of i-propanol were used per val Si-Cl. Prior to the addition of the siloxane, 150 ml of toluene were removed by distillation from the polyether-toluene solution for azeotropic drying of the mixture. The reaction was effected at 50°C. After 30 minutes and under vacuum conditions (14 mmHg or Torr) while raising the temperature to 70°C, the remaining toluene and forming HCl were removed.

The resulting polysiloxane-polyether-block polymer contains still 0.0113 · 10$^{-3}$ val of Cl/g product, which corresponds to 3.3 percent of the initially available Cl. For this reason, while dissolved in 375 ml of toluene, the product is finally neutralized with ammonia. After filtration and removal of the solvent by distillation, a product is obtained which has a viscosity of 1,319 cP. This product dissolves in water to a clear solution. For stabilization purposes, 0.35 percent by weight of ethanol amine were admixed to the product in the water solution. The product has foam stabilizing characteristics and when used in the foaming of polyurethane, it corresponds to a product which has been produced in analogous manner from the SO$_3$-containing starting siloxane in which, however, much larger salt amounts have to dealt with upon filtration. In foaming polyurethane according to the manual mixing procedure, both products were tested according to the following formulation:

100.00 parts by weight of polyol with an OH number of 47.5 and an ethyleneoxide : propyleneoxide ratio of 5 : 95, which was produced by the addition of alkyleneoxide to glycerine.
4.05 parts by weight of H$_2$O
3.00 parts by weight of trichlorofluoromethane
0.80 parts by weight of siloxane-polyether-block polymer
0.27 parts by weight of tinoctoate
0.15 parts by weight of dimethylethanolamine
0.05 parts by weight of N-ethylmorpholine.
52.50 parts by weight of toluylenediisocyanate T 80

Both the inventive product and also the comparison product caused the formation of a fine, uniform foam of a volume weight of 22.9 (kg/m$^3$). The two products were stored for four weeks at 80°C. In the inventive block polymer, foaming again resulted in an excellent foamed product of a volume weight of 22.9. By contrast, the comparison stabilizer yielded in this second test an increased volume weight of 23.4. This indicates the superiority in respect of storage resistance of the inventive foam stabilizer produced in accordance with th inventive procedure.

EXAMPLE 3

The starting product for this Example is again an SO$_3$-containing chlorosiloxane, prepared from dimethyldichlorosilane, methyltrichlorosilane, water and H$_2$SO$_4$, in a manner analagous to that described in connection with Example 2, the chlorosiloxane having 1.411 · 10$^{-3}$ val of Cl and 0.21 · 10$^{-3}$ mole of SO$_3$/g of substance.

a. 250 g of this siloxane were stirred with 25 g of hexamethylphosphoricacidtriammide for 6 hours and at 50°C. Analysis indicated that the upper phase obtained in this manner (247 g) contained thereafter only 0.003 · 10$^{-3}$ mole of SO$_3$/g and 1.24 · 10$^{-3}$ val of Cl/g. After a further treatment with 10 percent by weight of hexamethylphosphoricacidtriamide, no SO$_3$ can be detected in the siloxane.

b. Instead of using hexamethylphosphoricacidtriamide, dimethylacetamide was used. The siloxane is agitated with 10 percent by weight of the dimethylacetamide and the siloxane is subsequently recovered by phase separation. The procedure was twice repeated. The SO$_3$ value was reduced to 0.032 · 10$^{-3}$ mole/g.

c. The SO$_3$-content can be reduced to less than 0.04 · 10$^{-3}$ mole/g by proceeding in analogous manner with N-tetramethylethylphosphonicaciddiamide and repeating the procedure three times after the respective phase separations.

What is claimed is:

1. A process of removing sulfate groups from polysiloxanes which contain groups in which sulfate groups are intramolecularly and/or terminally linked to silicon atoms, which comprises reacting said polysiloxanes with peralkylated amides of at least one acid selected from the group consisting of carboxylic acids, phosphonic acids and phosphoric acids, whereby an SO$_3$-containing peralkylated acid amide phase is obtained and separating said phase.

2. A process as claimed in claim 1, wherein the reaction is effected by agitating or shaking said polysiloxanes with said peralkylated amides and wherein, after separation of said phase, a fresh amount of peralkylated amide is agitated or shaken with said polysiloxane to remove additional amounts of sulfate groups.

3. A process as claimed in claim 2, wherein the addition of fresh amounts of peralkylated amide and the subsequent phase separation are repeated until the polysiloxane is substantially devoid of sulfate groups.

4. A process as claimed in claim 1, wherein said peralkylated amide is a permethylated amide.

5. A process as claimed in claim 4, wherein the permethylated acid amide is selected from the group consisting of dimethylformamide, dimethylacetamide and hexamethylphosphoricacidtriamide.

6. A process as claimed in claim 1, wherein said peralkylated acidamide is selected from the group consisting of N-N'-tetramethylurea, diethylformamide, N-tetramethyl-ethylphosphonicaciddiamide, N-N'-tetraethylurea and diethylacetamide.

7. A process as claimed in claim 1, wherein the amount of peralkylated amide is in excess to the equivalent of the amount of sulfate groups in said polysiloxane.

8. A process as claimed in claim 1, wherein the reaction is carried out within a temperature range of about 10° to 80°C.

* * * * *